Oct. 17, 1950 A. J. ORTUSI ET AL 2,525,935
DEVICE FOR CREATING A MAGNETIC WAVE OF THE $H_0$ TYPE
IN A CIRCULAR SECTIONED GUIDE
Filed May 7, 1948 2 Sheets-Sheet 2

INVENTORS
ANTOINE J. ORTUSI
RAYMOND PAUL
*by Haseltine, Lake & Co.*
AGENTS

Patented Oct. 17, 1950

2,525,935

UNITED STATES PATENT OFFICE 2,525,935

DEVICE FOR CREATING A MAGNETIC WAVE OF THE $H_0$ TYPE IN A CIRCULAR SECTIONED GUIDE

Antoine Jean Ortusi and Raymond Paul, Paris, France, assignors to Compagnie Generale de Telegraphie Sans Fil, a corporation of France Application May 7, 1948, Serial No. 25,596
In France July 21, 1947

6 Claims. (Cl. 178—44)

This invention relates to wave guide arrangements for the propagation and conversion of very high frequency wave energy.

The object of the invention is to provide means whereby a magnetic wave of the $H_0$ type can be created in a wave guide of circular section. As is known such a wave presents numerous advantages for the transmission of very high frequency energy in a wave guide, notably that attenuation, due to imperfect conductivity of the walls of the guide, can be rendered extremely small with an $H_0$ wave.

Figure 1:
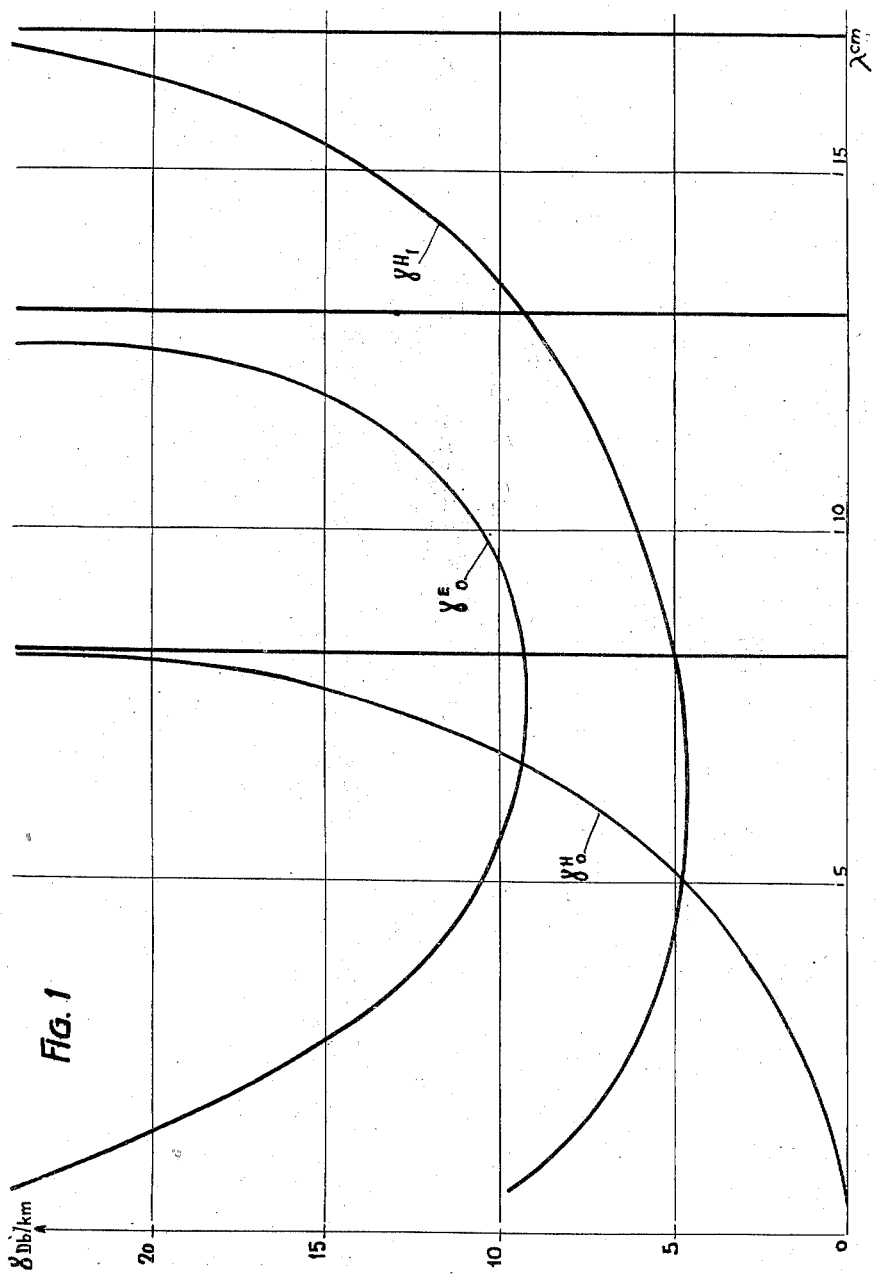
Figure 2:
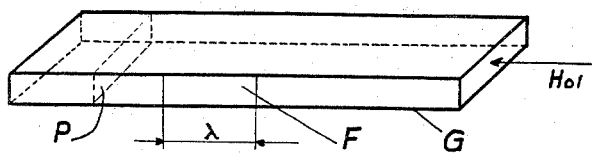
Figure 3:
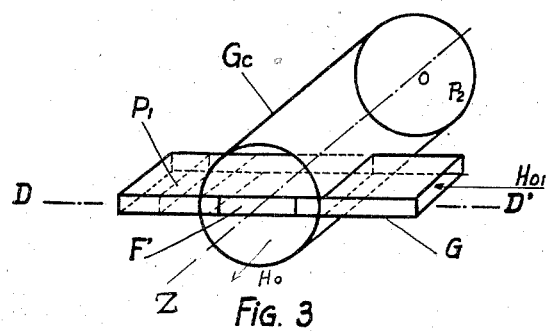

The invention is illustrated in and explained in connection with the accompanying drawings in which Fig. 1 is a graphical figure showing the relation, in a circular sectioned guide, between an attenuation constant $\gamma$ in decibels per kilometre and wave length $\lambda$ in centimetres; Fig. 2 is partly explanatory and partly illustrates a detail of the invention; Fig. 3 illustrates an embodiment of the invention; and Fig. 4 also illustrates a detail.

In effect the attenuation of a wave in a guide can be expressed as a function of a constant $\gamma$ such that the electric field decreases exponentially as a function of the abscissa $z$ measured along the axis of the guide, according to the expression $\epsilon^{-\gamma z}$.

This constant $\gamma$ depends on the radius of the circular sectioned guide, the resistivity of its wall and the wave length employed. It can be shown that, with a circular sectioned guide, the curves of variation of the coefficient $\gamma$, (expressed for example in decibels per kilometre) with wave length $\lambda$, present forms as represented in Fig. 1. As will be seen from this figure the coefficient $\gamma_{H0}$ for an $H_0$ wave tends towards zero with wave length $\lambda$ while the coefficients $\gamma_{H1}$ and $\gamma_{E0}$, for an $H_1$ wave and an $E_0$ wave respectively, pass through a minimum value. It therefore results that it is possible with an $H_0$ wave, to transmit high frequency energy with lower losses than with the other types of wave, in a circular sectioned guide.

This invention seeks to take advantage of the foregoing fact by providing means for creating, from an initial $H_{01}$ wave a stable $H_0$ wave in a circular sectioned guide. The explanations which follow, taken in conjunction with the schematic accompanying figures, will enable the general method of the invention to be understood and show the great simplicity and convenience of its practice.

Referring now to Figure 2 it will be seen that a window F, cut in the smaller side of a rectangular sectioned guide G in which a $H_{01}$ wave is propagated, will radiate energy to an extent variable in dependence upon its arrangement (position, dimensions and so on . . . ). In particular it is possible to pass all the energy through the window if its length approximates to the working wave length $\lambda$ and a plane conductor partition P is suitably positioned in the guide after the window. The magnitude of the electric field will vary from end to end of the window, passing through two maxima and having zero value in the middle of the window.

In accordance with the invention such an arrangement is used for the excitation of a circular sectioned guide, to create therein a $H_0$ wave in the following manner:

Referring to Figure 3 the rectangular guide G is arranged to traverse a circular guide Gc passing through it along a diametrical plane DD passing through the axis OZ of the guide Gc, the smaller side of G being perpendicular to the axis OZ. Energy for excitation of the circular guide is fed through the rectangular guide G along which is propagated an $H_{01}$ wave.

In the smaller side of the rectangular guide G is cut a window F, of regulatable length, disposed symmetrically with respect to the axis OZ of the circular guide. Two slidable conductive partitions $P_1$, $P_2$ placed respectively at the ends of the rectangular and circular guides, serve in effect to adjust the flow of energy through the window, by preventing undesired reflection of waves from the closed ends of the guides, as will be readily understood.

Figure 4:
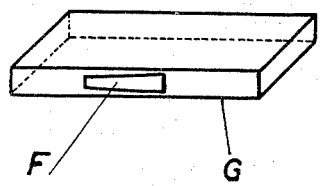

With this arrangement, by suitable formation of the window, an equal distribution of the energy can be obtained on both sides of the axis OZ in the circular guide. Figure 4 shows, purely by way of example, a trapezoidal window which is very suitable for use for the purpose in question.

As will be understood, if it is desired to eliminate any other waves which might be produced, a filter may, if necessary, be interposed in the circular guide.

What we claim is:

1. A wave guide arrangement for transforming a wave of $H_{01}$ type propagated in a rectangular wave guide, into a wave of $H_0$ type propagated in a circular wave guide, wherein a waveguide comprises a hollow conductive member adapted to propagate electromagnetic wave energy in the ultra-high range of frequencies characterised in that the said rectangular guide is arranged to traverse the circular guide with the plane of longitudinal symmetry of the rectangular guide parallel to the larger side of its cross section and parallel to the axis of revolution and the circular guide and containing this axis, the portion of the rectangular guide in the interior of the circular guide having a window of appropriate length cut in a wall providing one of the smaller sides of its cross section, said window being disposed symmetrically with respect to said axis of the circular guide.

2. An arrangement as claimed in claim 1 wherein the length of the window is substantially equal to the wave length employed.

3. An arrangement as claimed in claim 1 wherein the window is trapezoidal.

4. An arrangement as claimed in claim 1 wherein the window is trapezoidal and of a length substantially equal to one working wave length.

5. A wave guide coupling arrangement for transforming a wave of $H_{01}$ type propagated in a rectangular wave guide, into a wave of $H_0$ type propagated in a circular wave guide, wherein a wave guide comprises a hollow conductive member adapted to propagate electromagnetic wave energy in the ultra-high range of frequencies, said arrangement comprising a rectangular guide having a Y-axis parallel to the long side of its cross section and excited by a $H_{01}$ type of wave, traversing at a right angle a circular guide in such a manner that its Y-axis is parallel to the longitudinal central Z-axis of the last mentioned guide, the plane of longitudinal symmetry of the rectangular guide parallel to its top and bottom walls being parallel to the Z-axis of the circular guide and coinciding therewith, the portion of the rectangular guide in the interior of the circular guide having a window of appropriate length cut in a wall providing one of the smaller sides of its cross section, said window being disposed symmetrically with respect to said axis of the circular guide.

6. A wave guide coupling arrangement according to claim 5, wherein one end of each guide is closed and wherein there are included conductive slidable transverse matching partitions at the closed ends of the two guides.

ANTOINE JEAN ORTUSI.
RAYMOND PAUL.

REFERENCES CITED

The following references are of record in the file of this patent:

UNITED STATES PATENTS

| Number | Name | Date |
|---|---|---|
| 2,200,023 | Dallenbach | May 7, 1940 |
| 2,407,318 | Mieher | Sept. 10, 1946 |
| 2,471,021 | Bradley | May 24, 1949 |